United States Patent [19]

Pendergrass, Jr.

[11] Patent Number: 5,128,215
[45] Date of Patent: Jul. 7, 1992

[54] MAGNETIC RECORDING MEDIA BINDER RESIN COMPRISING A MIXTURE OF A STRAIGHT BLOCK COPOLYMER AND A STAR BLOCK COPOLYMER

[75] Inventor: Daniel B. Pendergrass, Jr., Mendota Heights, Minn.

[73] Assignee: Minnesota Mining & Manufacturing Company, St. Paul, Minn.

[21] Appl. No.: 353,978

[22] Filed: May 19, 1989

[51] Int. Cl.$^5$ .............................................. G11B 5/00
[52] U.S. Cl. ................................. 428/694; 428/900; 252/62.54
[58] Field of Search ........................... 428/900, 694; 252/62.54

[56] References Cited

U.S. PATENT DOCUMENTS

| | | | |
|---|---|---|---|
| 4,412,941 | 11/1983 | Probst et al. | 252/511 |
| 4,426,495 | 1/1984 | Vitus et al. | 525/92 |
| 4,490,505 | 12/1984 | Pendergrass, Jr. | 524/591 |

FOREIGN PATENT DOCUMENTS 59-196340  11/1984  Japan.
1190417  5/1970  United Kingdom.

OTHER PUBLICATIONS

Japanese Patents Gazette, Week 8436, J5-G, Abstract No. 84-221847/36, & JP, A, 59129267.

Japanese Patents Gazette, Week 8436, J5-G, Abstract No. 84221846/36, & JP, A, 59129266.

*Encyclopedia of Polymer Science and Engineering* John Wiley & Sons, vol. 2, p. 398, Table 13.

J. M. G. Cowie, "The Effect of Solvent on the Physical Properties of Blocked Copolyners", *Applied Sciences Development in Block Copolymers*.

"Effect of Surface Treatments on Rheological, Mechanical and Magnetic Properties of Ferrite-Filled Polymeric Systems", D. R. Saini, A. V. Shenoy, and V. M. Nadkarni, *Polymer Engineering and Science*, No. 13, 25, 807 (1985).

*Primary Examiner*—Merrell C. Cashion, Jr.
*Assistant Examiner*—Stevan A. Resan
*Attorney, Agent, or Firm*—Merchant, Gould, Smith, Edell, Welter & Schmidt

[57] ABSTRACT

The present invention provides an improved magnetic recording medium comprising a non-magnetic support with at least one magnetic layer comprising a magnetizable pigment dispersed in a binder composition. The binder composition of the present invention comprises a block copolymer, having a hard segment, with a glass transition temperature ($T_g$) of greater than about 70° C., and a soft segment, having a $T_g$ of less than about $-30°$ C. The binder composition of the present invention has relatively stable physical properties over a range of temperatures, preferably at least 50° C. at more preferably at least 100° C.

5 Claims, 4 Drawing Sheets

MAGNETIC RECORDING MEDIA BINDER RESIN COMPRISING A MIXTURE OF A STRAIGHT BLOCK COPOLYMER AND A STAR BLOCK COPOLYMER

TECHNICAL FIELD

The present invention relates to magnetic media and particularly to an improved magnetic media made from high molecular weight materials.

BACKGROUND OF THE INVENTION

The use of magnetizable particles affixed to various substrates to record, store, and reuse information continues to increase. The various forms of magnetizable particles affixed to a substrate, often termed magnetic media, include, audio tapes, video tapes, computer diskettes, computer tapes, data cartridges and many other products. In each of these constructions, magnetic particles are bound to a substrate and information is recorded and stored in the magnetizable particles for later retrieval and use.

Magnetic media must possess certain physical and magnetic properties to be suitable for use with the various magnetic reading and recording devices. The surface of the media must be sufficiently smooth so that when read by the magnetic head the recorded signal is read accurately. Asperities or roughness in the media surface can result in unacceptable levels of signal to noise ratio. The media must also be very durable. It must be able to record and reproduce information repeatedly, preferably thousands, if not millions, of times. To be durable, the magnetic particles must be firmly bound to the substrate and not be worn off by the passing of the magnetic head over the media. In addition, it is important that the media have sufficient lubricity so that the magnetic head passes freely over the surface with a minimum coefficient of friction, preferably without the necessity of added lubricants. Another important characteristic of a magnetic media is that it have very uniform physical properties over a wide temperature range, such as a range of 100° C.

Typically, a magnetic media is produced by passing a non-magnetic support through an apparatus which coats the support with a liquid dispersion of the magnetic layer. This dispersion consists of a binder, in either an uncured or solvated state, having the magnetizable particles homogeneously dispersed therein. After coating, the dispersion dries or cures leaving a tough binder film having the magnetizable particles uniformly distributed throughout.

The desired physical and magnetic properties are often dictated by certain processing parameters. One important parameter is good pigment wetting in the bulk liquid dispersion. Good pigment wetting is closely related to dispersion stability and both are necessary to insure evenly distributed pigment throughout the dispersion and throughout the finished magnetic coating. Another important processing parameter is the so-called pot life of the dispersion, the time for which the dispersion can be kept sufficiently non-viscous before coating. In general terms, a short pot-life, caused by a fast cure of the binder, creates time constraints in the coating process and problems in obtaining a sufficiently smooth surface on the magnetic layer. A longer pot-life often requires a slower cure rate, often resulting in the coated magnetic layer suffering damage as it is passed through the coating apparatus in its insufficiently cured state.

A majority of conventional magnetic media binders are derived from lower molecular weight materials which require curing to generate a binder resin having the appropriate physical properties. In addition to the pot-life considerations discussed above, the use of curable low molecular weight starting materials can cause additional problems. The dispersion of the low molecular weight materials may prematurely gel or cause flocculation of the magnetic particles resulting in non-uniform and unacceptable magnetic performance of the coatings. In addition, low molecular weight materials may remain in the binder after coating resulting in poor durability of the magnetic coating. Further, low molecular weight materials left after curing may migrate to the surface of the media, and come into contact with the recording head where they can adversely affect performance through increased friction, stiction, head clogging, and/or poor blocking resistance.

Other problems encountered by magnetic media using conventional curable binder systems known in the prior art include hydrolysis of the binder and degradation of the binder by humidity. In addition, the activation or cure steps required by conventional binder systems with curable lower molecular weight starting materials create additional complicated and expensive production steps.

Known polymeric binder systems experience a change in physical properties over a range of temperatures. In use, magnetic media are often exposed to a wide range of temperatures, often over a range in excess of 100° C. The modulus of the binder material will typically substantially change over this range, for example, from stiff and brittle to soft and tacky. These changes in physical properties can cause performance problems in the use of the media.

In view of the above deficiencies in prior art magnetic media binders, there is a need to provide a binder suitable for use in magnetic media which is comprised of high molecular weight starting materials, which do not require polymerization or crosslinking to form a suitable magnetic coating. In addition, it is desirable that these high molecular weight binder materials provide good pigment wetting and dispersion stability, including systems with high pigment loadings. It is also desirable that the magnetic media have excellent mechanical properties, such as smoothness, durability and lubricity, along with excellent electrical properties, such as signal-to-noise ratio. It is also desirable that the physical and magnetic properties of the media are relatively uniform throughout a wide range of temperatures.

SUMMARY OF THE INVENTION

The present invention therefore provides an improved magnetic recording medium comprising a non-magnetic support with at least one magnetic layer comprising a magnetizable pigment dispersed in a binder composition. The binder composition of the present invention comprises a block copolymer, having a hard segment, with a glass transition temperature ($T_g$) of greater than about 70° C., and a soft segment, having a $T_g$ of less than about 31 30° C.

The binder composition of the present invention has relatively stable physical properties over a range of temperatures. A plot of the Log of the Modulus (E') in dynes/cm$^2$ versus temperature in degrees C, gives a plot having a plateau region. The absolute value of the average slope of the plateau region, S, is less than $8 \times 10^{-3}$, preferably less than $5 \times 10^{-3}$, and most preferably less than $2 \times 10^{-3}$. The plateau region extends over a temperature range of at least 50° C., and preferably over a temperature range of at least 100° C.

The binder composition of the present invention comprises a block copolymer having the following general formula:

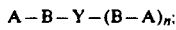
$$A-B-Y-(B-A)_n;$$

wherein Y is a single bond or a multifunctional coupling agent;

A is a hard polymeric segment having a $T_g$ of greater than about 70° C.;

B is a soft polymeric segment having a $T_g$ of less than about −30° C.; and n is about 1 to 15

Glass transition temperature ($T_g$) is defined as the temperature at which the polymer changes from a hard brittle glassy material to a rubbery or viscous polymer.

DETAILED DESCRIPTION OF THE INVENTION

Figure 1:
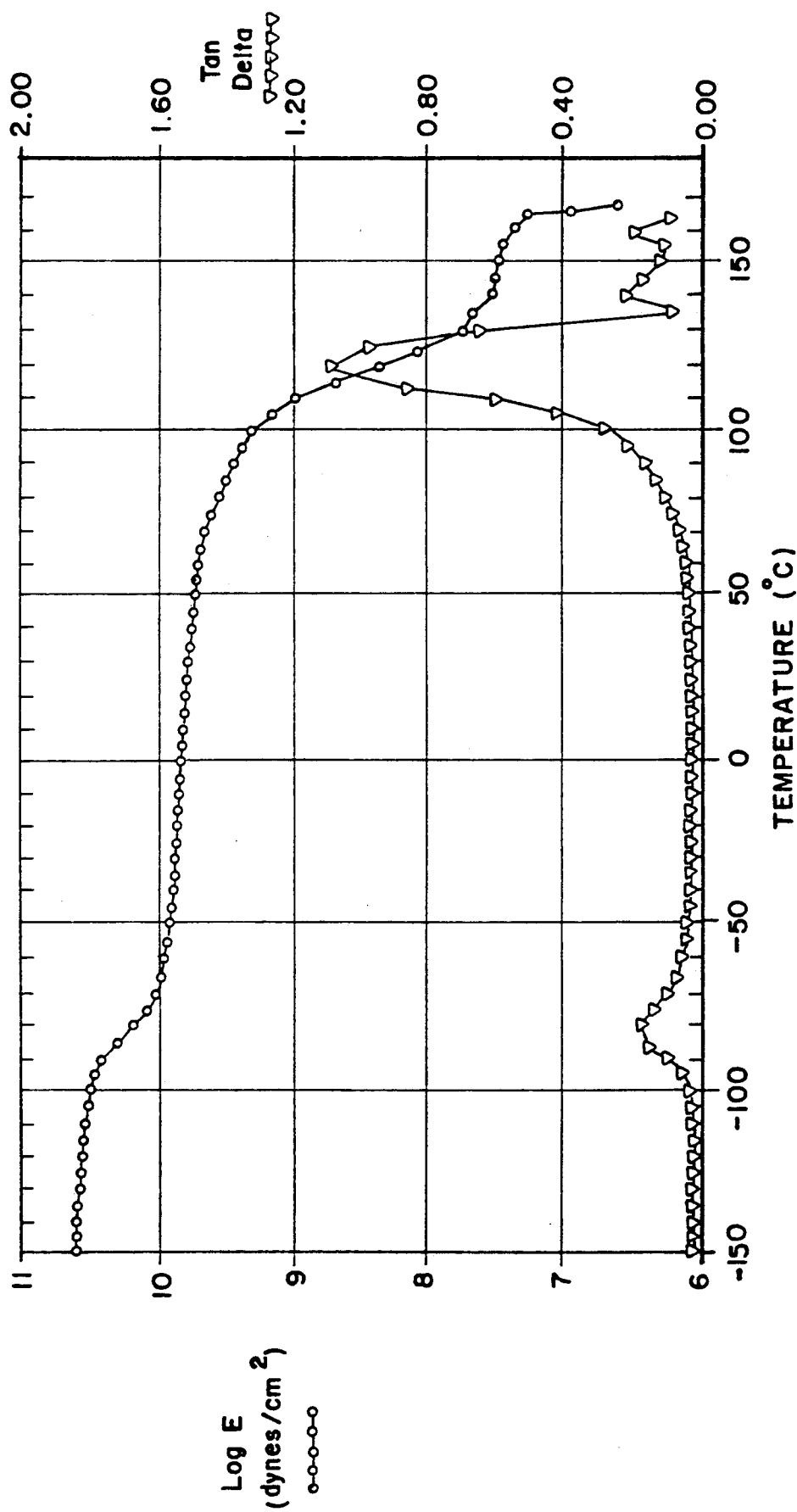
FIG. 1 is a plot of the Log E' in dynes/cm² versus Temperature in °C., for a binder material of the invention.
Figure 2:
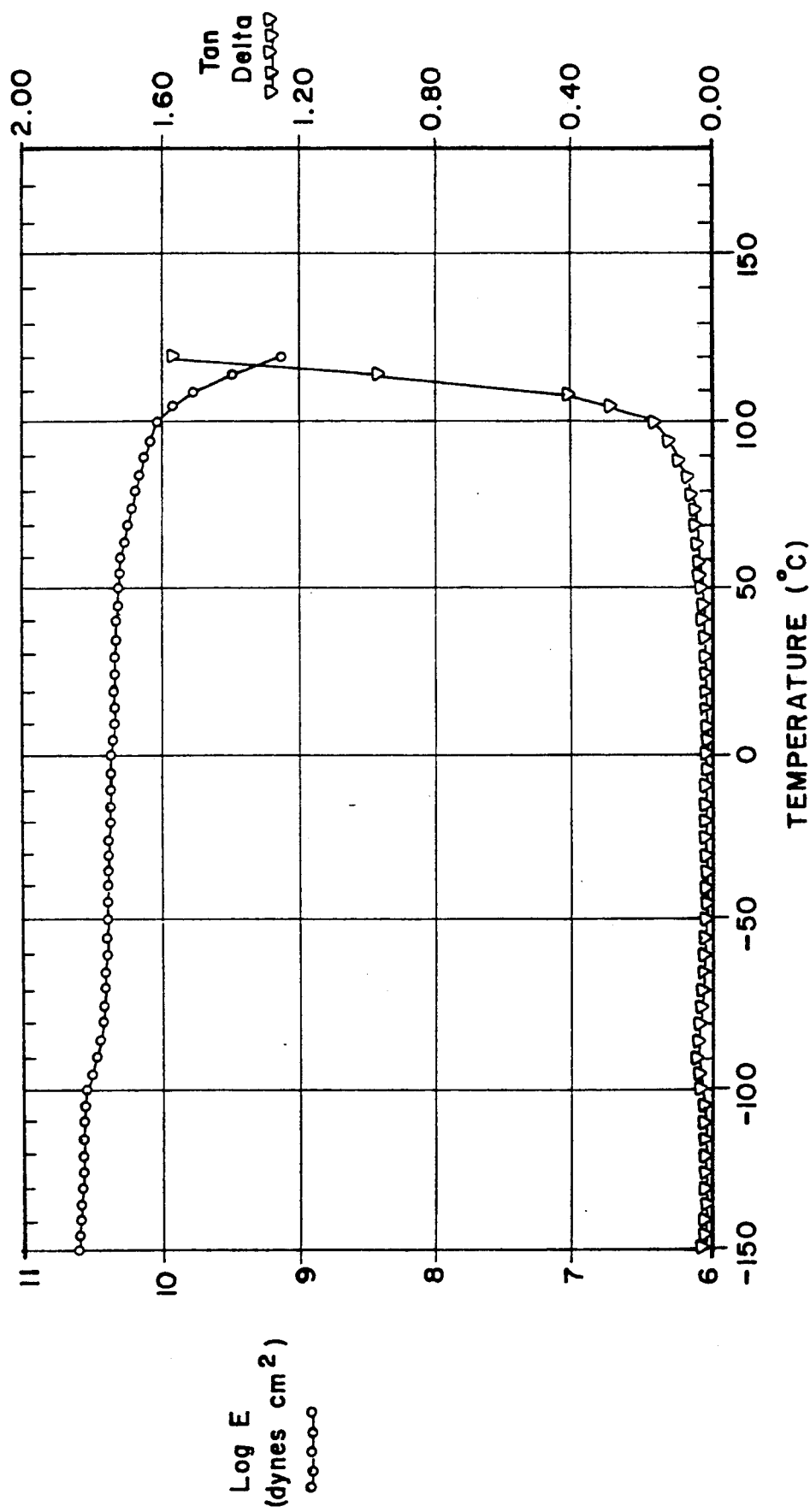
FIG. 2 is a plot of the Log E' in dynes/cm² versus Temperature in °C., for a binder material of the present invention.
Figure 3:
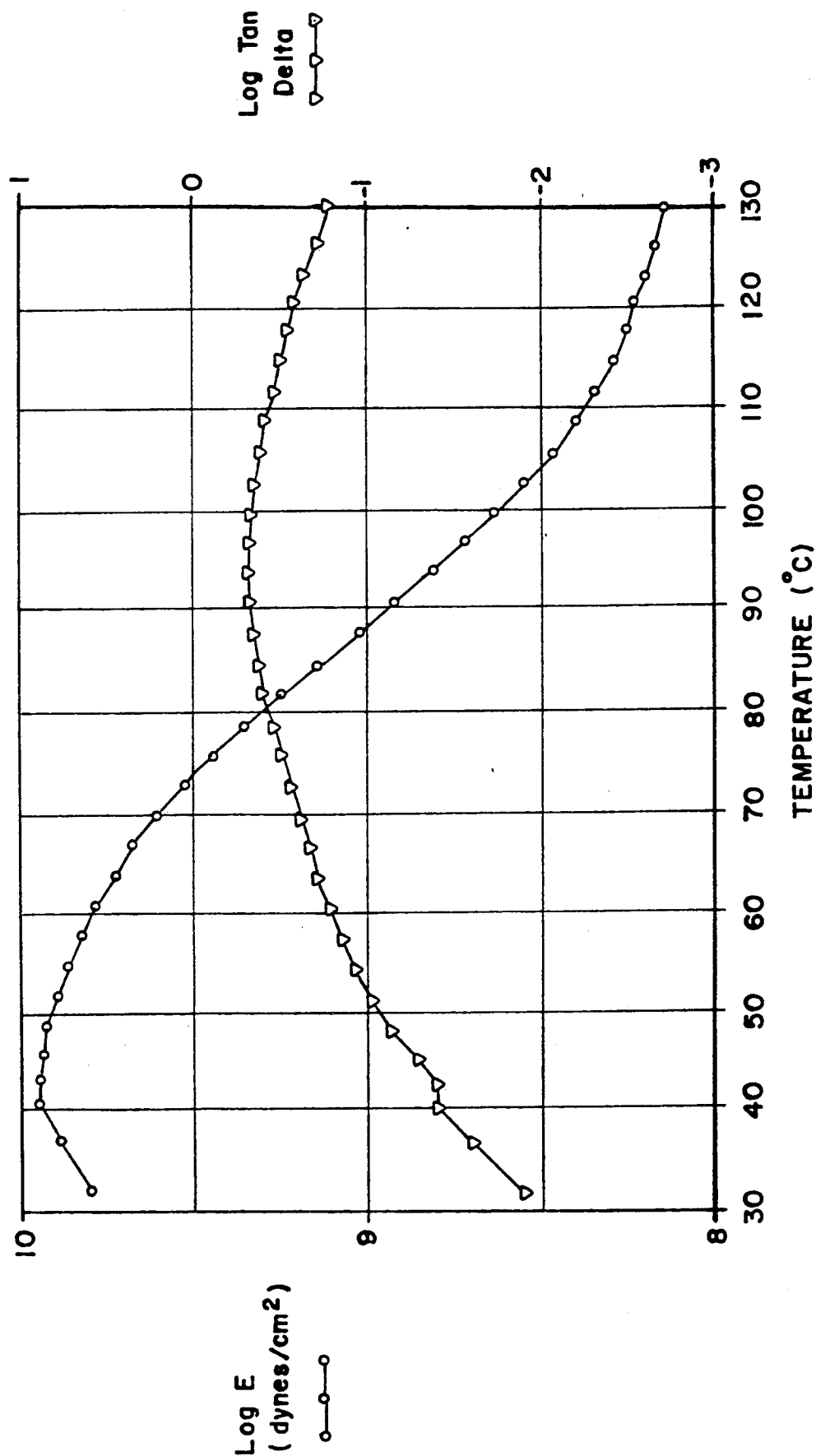
FIG. 3 is a plot of the Log E' in dynes/cm² versus Temperature in °C., for a comparative example of a known binder material.
Figure 4:
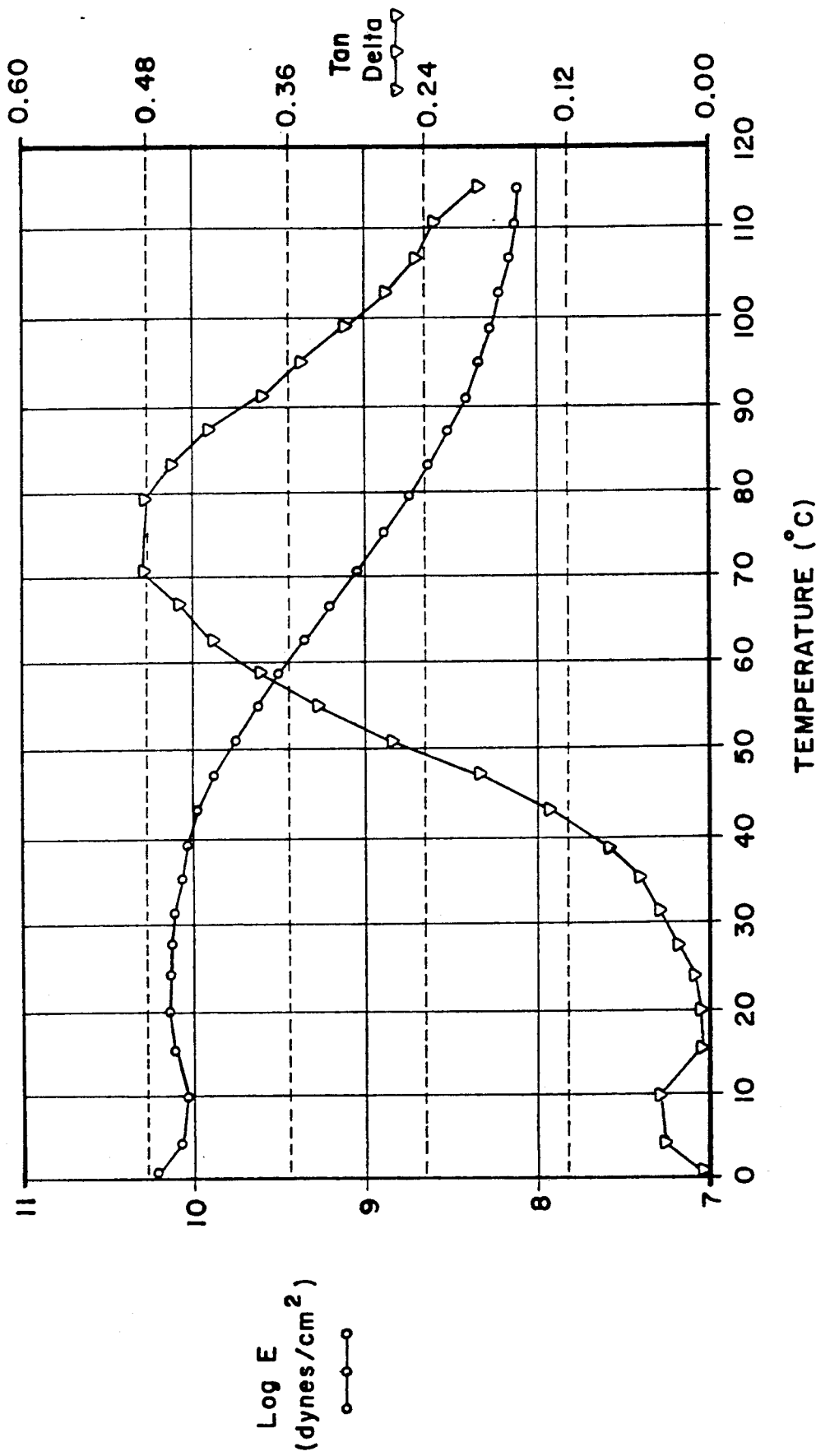
FIG. 4 is a plot of the Log E' in dynes/cm² versus Temperature in ° C., for a comparative example of a known binder material.

The present invention provides an improved magnetic media that utilizes high molecular weight starting materials in a binder composition to secure the magnetizable pigment to a non-magnetic support. The magnetic media of the present invention is capable of having excellent electrical properties, such as signal-to-noise ratio. In addition, the properties of the instant magnetic media are very uniform over a wide range of temperatures, typically a range of at least 50° C., and preferably at least 100° C. The magnetic media of the present invention generally comprise a binder material, magnetizable pigment, and additives, coated on a non-magnetic support.

Binder

The binder composition comprises a block copolymer, having a hard segment, A, with a $T_g$ greater than about 70° C., and a soft segment, B, with a $T_g$ below about −30° C. The molecular weight of the hard segment, A, is preferably about 10,000 to 75,000, and the soft segment, B, preferably has a molecular weight of about 15,000 to 75,000.

The hard segment, A, is preferably a homopolymer comprised of a monovinyl aromatic monomer. Segment A will typically have a molecular weight of about 10,000 to 100,000, and preferably about 20,000 to 75,000. The monomer, molecular weight, and polymerization process of the hard segment is selected such that the $T_g$ of the hard segment A is greater than about 70° C.

The soft segment, B, is preferably a homopolymer comprised of a conjugated diene monomer. Segment B will typically have a molecular weight of about 10,000 to 100,000, and preferably about 15,000 to 75,000. The monomer, molecular weight, and polymerization process of the soft segment, B, are selected such that the $T_g$ is below about −30° C.

The manufacture of block copolymers is well-known in the art. For example, the homogeneous A block may be

$$A^* + A \rightarrow AA^*$$

An AB block can be grown by adding B to an AA* chain as follows:

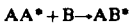
$$AA^* + B \rightarrow AB^*$$

The AB* chains will frequently couple together to form ABA blocks.

A multifunctional coupling agent can also be added to the system to form branched or star configurations. The predominant reaction product of the coupling reaction results in a block copolymer having the general formula:

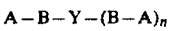
$$A-B-Y-(B-A)_n$$

wherein Y is a single bond or a multifunctional coupling agent, and n is about 1 to 15.

The star block copolymer component (n=2 to 15) may be blended with the linear block copolymer component (n=1) or may be used exclusively, as end use considerations dictate. Star block copolymers are useful in the present invention because of their superior tensile properties and high, relatively flat, elastic moduli.

The morphological structure of the resultant block copolymers is dependent on such factors as solvent, initiator, ratios of components, etc. Structures including spheres, cylinders, lamellae, short rods and rough networks are typically formed. See J. M. G. Cowie, *Development in Block Copolymers*, Applied Sciences, 18–35, (1982).

Pseudo-block copolymer configurations of soft and hard homopolymers can also provide the plateau region of the present invention. Small, distinct regions of hard and soft homopolymers cross-linked together at their boundaries with a suitable crosslinking agent, may provide similar performance to a block copolymer configuration. The regions would typically be 50 to 120 nm in the largest dimension. Suitable crosslinkers include the aziridine crosslinking agents described in U.S. Pat. No. 4,490,505, which is incorporated herein by reference.

Examples of the vinyl substituted aromatic compounds which may be used as monomers to produce the homopolymers of segment A include styrene, 3-methylstyrene, 4-methylstyrene, 4-ispropylstyrene, 2-ethyl−4-benzylstyrene, 4-p-tolystyrene, 4(4-phenyl-n-butyl) styrene, 2,4-dimethylstyrene, 2,4,6-trimethylstyrene, 3-methyl−5-n-hexylstyrene, sulfonated styrene, 1-vinylnaphthalene, 2-vinylnaphthalene, the alkyl, cycloalkyl, aryl, alkaryl, and aralkyl derivatives of vinylnaphthalene and the like.

In addition to vinyl substituted aromatic compounds other examples of suitable monomers for segment "A" include: acrylonitriles, $C_1$-$C_3$(alkyl), $C_1$-$C_3$(alkyl)acrylates (e.g. methyl methacrylate), and vinyl pyridines.

Preferred conjugated dienes for use as monomers in the soft segment B of the present invention are those having from 4 to 12 carbon atoms. Examples of suitable conjugated dienes include 1,3-butadiene, isoprene, 1,3-pentadiene (piperylene), 2,3-dimethyl-1,3-butadiene, 3-butyl-1,3-octadiene, 1-phenyl-1,3 butadiene, 1,3-hexadiene, 1,3-octadiene, 4-ethyl-1,3-hexadiene, 1-chloro-1-3-butadiene, and the like. The use of a butadiene, isoprene or piperylene is preferred.

Examples of anionic polyfunctional coupling agents, component Y, that are suitable for use in the present invention include divinyl benzene, silicon tetrachloride and ethylene dibromide.

The polymers may be hydrogenated after formation of the block copolymer to remove remaining unsaturation to prevent further crosslinking or oxidative cleavage.

NON-MAGNETIC SUPPORT

The dispersion of binder material, magnetic pigment, and additives is coated onto a nonmagnetic support or base film. Typical base films include, polyethylene terephthalate, polyethylene-2-6-naphathalate, cellulose acetate, cellulose triacetate, polyvinyl chloride, polyethylene, polypropylene, polycarbonate, polyamides, and others well known in the art. The non-magnetic support film is coated on one or both sides with magnetic pigment dispersed in the high molecular weight binder compound. The thickness of the base film is typically about 3 to 100 micrometers, and preferably about 5 to 50 micrometers.

The support may have a magnetic coating on both sides of the support or the back side may be coated with a binder material containing carbon black or other static reducing non-magnetic pigment.

Magnetic Pigment and Additives

The magnetic pigment that is utilized in the present invention may be any magnetic pigment suitable for the desired end use of the media. A preferred magnetic pigment is an acicular ferromagnetic powder having a length of between about 0.1 and about 1.0 microns and a ratio of length and width (major axis length/minor axis length) of between about 2 and about 20. Examples of magnetic powders which may be utilized in the present invention include gamma hematite (gamma-$Fe_2O_3$); magnetite ($Fe_3O_4$); mixed crystal of gamma —$Fe_2O_3$ and $Fe_2O_4$; cobalt-doped $Fe_2O_3$; cobalt-doped $Fe_3O_4$; cobalt-doped mixed crystal of $Fe_2O_3$ and $Fe_3O_4$, chromium dioxide ($CrO_2$); various kinds of acicular magnetic alloy powders such as Fe-Co, Co-Ni, Fe-Co-Ni, Fe-Co-B, Fe-Co-Cr-B, Mn-Bi, Mn-Al, Fe-Co-V or the like; nitride of Fe, Fe-Co, Fe-Co-Ni, fine iron, or the like; or mixtures of two or more of the above or other magnetic materials.

In addition to the magnetic pigment various other additives can be added as required. For example, dispersing agents, lubricants, antioxidants, nonmagnetic pigments and other specific additives may be added to enhance the performance of the recording medium.

Examples of lubricants include saturated and unsaturated fatty acids, fatty acid esters, higher fatty acid amides, higher alcohols, silicone oils, mineral oils, molybdenum disulfide, perfluoro ethers, and the like.

Examples of antioxidants which may be used in the magnetic media of the present invention include salicylanilide, tin oxide, mercury phenyloctoate, copper naphthenate, zinc naphthenate, trichlorophenol, p-dinitrophenol, sorbic acid, butyl p-oxybenzoate, dihydroacetoacetic acid and the like.

Dispersing agents serve to chelate the magnetic particles and individually suspended the particles within the uncured binder to permit the maximum orientation in the desired tangential direction along the media surface after coating the dispersion of magnetic pigment. Effective dispersants include acrylates, carboxylate polyesters, phosphate esters, phosphate ethers, titanate coupling agents, lecithin, alkylsulfate, fatty acid amides, and the like.

Non-magnetic pigments which may be added as a head cleaning agent or for other purposes include silicon oxide, titanium oxide, aluminumoxide, chromium oxide, calcium carbonate, zinc oxide, and $\alpha$ $Fe_2O_3$, talc, kaolin, silicon carbide, carbon black and the like.

Formulation and Testing of the Media

The magnetic recording media of the present invention can be made by conventional techniques for making pigment/binder media. For example, a dispersion is made by milling the ingredients of the magnetizable layer (e.g., binder, gamma ferric oxide pigment, dispersant, solvent, lubricant, and carbon black) for a sufficient time to obtain a uniform dispersion. The milled dispersion is then applied in a coating process, such as gravure or knife coating, to a flexible support (e.g., polyester film). After coating, the coated backing or support material undergoes orientation in a magnetic field to align the magnetizable particles. The recording medium is then dried and cut into a desired size and shape for end use.

To produce the magnetic media of the present invention, it is preferred that the block copolymer be dissolved in a single solvent such as toluene to avoid the precipitation of open gel structures with imbibed nonsolvent during drying, however, alternate solvents or solvent blends may be employed if the formulator wishes to influence the polymer morphology of the final article.

The fact that no activation or cure steps are required to produce the binder composition for the inventive magnetic media allows a greatly simplified production process to be employed. The reduction in the number of binder components reduces the opportunity for mischarges and the absence of pot life constraints allows the dispersion to be tested for correct composition prior to coating. Clean up of the coating apparatus has been found to be much easier than with prior art binder systems. Surface treater delays, often present in use of prior art binders, are minimized.

The block copolymers of the present invention have a number of chemical and mechanical properties that make them especially well suited for use in magnetic media. The hydrocarbon backbone of the binder of the present invention is not subject to hydrolysis, a well known problem in the use of conventional urethane binders. Also, performance variations due to humidity are reduced because of the absence of polar groups in the binder composition. The phase separation which characterizes the block polymers of the present invention provides a flat modulus vs. temperature profile, or plateau, between the $T_g$s of the constituent polymer blocks. The plateau extends beyond the environmental range normally required for magnetic media performance and may be raised or lowered to tailor the product for a particular end use by varying the ratio of the particular block copolymer components.

The molecular weights of the binders of the present invention are generally high enough to ensure chain entanglements which, together with the high $T_g$ of the hard block have been found to significantly reduce the problems associated with creep.

Formulations produced according to the present invention have shown excellent pigment wetting and dispersion stability. Magnetic performance has been at least equivalent to the use of conventional binder materials. The binders accept high pigment loadings (above 80% of the coating composition) without undue degradation of the composite mechanical properties. Typical coefficients of friction of media of the present invention have been about 0.2 without added lubricants, as compared to values of 0.3 and higher for conventional urethane binder systems. Blocking resistance has been excellent. Especially with use of non-plasticizing lubricants, media can be made having excellent durability.

This invention is further described and illustrated by the following non-limiting Examples:

EXAMPLES 1-8

Magnetic media of the present invention were made by combining the ingredients in Table 1 as follows:

To a small shot mill, the pigment, the TD 100 and the toluene were added and mixed briefly. Next the KR01 and the carbon black, if any, were added and the mixture was milled for 30 minutes. The Kraton 1101 was added next and the mixture was milled for an additional 10 minutes. The mixtures were then filtered and coated onto an unprimed polyethylene terepthalate backing with a 5 cm coater. The coatings were calendared and tested, giving the results in Table 2.

TABLE 1

| Example Components | 1 | 2 | 3 | 4 | 5 | 6 | 7 | 8 |
|---|---|---|---|---|---|---|---|---|
| | Weight in Grams | | | | | | | |
| KR01[1] | 19.8 | 25.5 | 20.7 | 26.7 | 14.0 | 18.0 | 14.7 | 18.9 |
| Kraton 1101[2] | 8.5 | 2.8 | 8.9 | 2.9 | 6.0 | 2.0 | 6.3 | 2.1 |
| Carbon Black | — | — | 1.2 | 1.2 | — | — | — | 1.2 |
| Toluene | 38.5 | 38.5 | 43.5 | 43.5 | 38.5 | 38.5 | 43.5 | 43.5 |
| Pigment[3] | 30 | 30 | 30 | 30 | 30 | 30 | 30 | 30 |
| WAPHOS-TD 100[4] | 1.5 | 1.5 | 1.5 | 1.5 | 1.5 | 1.5 | 1.5 | 1.5 |

[1]KR01 is a "K-Resin", Butadiene/styrene (BDS) polymer from Phillips Chemical Co. The styrene block has a 12,000 M.W., butadiene block has a 28,000 M.W. with 65% styrene and 35% butadiene in a star polymer configuration, with predominantly 3 arms, but some 4 and 6 arms.
[2]Kraton 1101 is a ABA styrene/butadiene/styrene copolymer from Shell; 30% styrene, 70% butadiene.
[3]An acicular gamma iron oxide
[4]Obtained from the Philip A. Hunt Chemical Corp., Organic Div., P.O. Box 4249, Massasoit Ave., East Providence, RI 02914

TABLE 2

| Example | D.L. Wear | Coef. Friction | $\Phi_r$ | Squareness | $H_c$ | $B_r$ |
|---|---|---|---|---|---|---|
| 1 | 9.9 | 0.22 | 605 | 0.776 | 327 | 1233 |
| 2 | 43.0 | 0.3 | 659 | 0.725 | 327 | 1256 |
| 3 | 15.5 | 0.27 | 524 | 0.759 | 325 | 1098 |
| 4 | 33.5 | 0.23 | 553 | 0.767 | 327 | 1127 |
| 5 | 16.9 | 0.2 | 553 | 0.781 | 311 | 1337 |
| 6 | 32.8 | 0.23 | 688 | 0.780 | 310 | 1313 |
| 7 | 3.7 | 0.22 | 498 | 0.761 | 311 | 1252 |
| 8 | 22.5 | 0.22 | 591 | 0.761 | 311 | 1239 |

EXAMPLES 9-12

Magnetic media of the present invention were made by combining the ingredients as set forth in Table 3. To a small shotmill, the pigment, dispersing agent, and solvent were added and mixed briefly. Next, the binder polymer present as 36% solids in cyclohexanone was added along with the lubricant and the mixture was milled for 30 minutes. The mixture was filtered, deaerated and coated on a PET backing using a knife coater. The coating was calendared and tested. The test results are reported in Table 4.

TABLE 3

| Example Components | 9 | 10 | 11 | 12 |
|---|---|---|---|---|
| | Wt. in grams | | | |
| Binder A[1] | 23.8 | 23.8 | 16.2 | 16.2 |
| 400DL[2] | 0.6 | — | 0.5 | — |
| Oleic acid[3] | — | 0.6 | — | 0.5 |
| Pigment[4] | 30 | 30 | 30 | 30 |
| Emcol Acetate[5] | 1.2 | 1.2 | 1.2 | 1.2 |
| Cyclohexanone | 42.6 | 42.6 | 44.3 | 44.3 |

[1]Binder A (36% solids in cyclohexanone) was an ABA, styrene/Butadine/styrene block with styrene blocks - 52,000 MW and butadiene Blocks - 88,000 M.W. The polymer was 90% coupled.
[2]Lubricant - polyethylene glycol dilaurate - M.W. 400 commercially available from Hodag
[3]Lubricant.
[4]An acicular gamma iron oxide.
[5]Dispersing agent - commercially available from Witco Chemical Corp., 277 Park Ave., New York, NY 10017

TABLE 4

| Example | Coef. Friction | $\Phi_r$ | Squareness | $H_c$ | $B_r$ |
|---|---|---|---|---|---|
| 9 | 0.25 | 549 | 0.819 | 284 | 1644 |
| 10 | 0.2 | 649 | 0.806 | 284 | 1774 |
| 11 | 0.25 | 736 | 0.804 | 278 | 1780 |
| 12 | 0.2 | 759 | 0.796 | 279 | 1830 |

EXAMPLES 13, 14, A and B

A comparative magnetic medium (Example A) was prepared by mixing 7 parts Emcol Acetate, VROH vinyl binder resin from Union Carbide, in a 1:1 mixture of toluene and methyl ethyl ketone to give a 70% grinds solids mixture. 100 parts of a magnetic pigment was also mixed in. The mixture was milled for 25 minutes with a 15 minute thin down using MEK solvent. The final percent solids was 48%. The Example 13 medium was made in a similar manner except the binder was Binder A and the thin-down solvent was toluene. Comparative Example B was prepared by mixing 7% by weight of the pigment TD100, an Estane 5707 binder (BFG), and a fine particulate iron pigment at 80% grind solids and a 4:1 ratio of pigment to binder polymer. Toluene was used as a mill solvent. Milling was for 45 minutes with a 15 minute thin-down. The final percent solids was 50%. Example 14 was made in a similar manner except the binder was Binder A. The test results are set forth in Table 5.

TABLE 5

| Example | Squareness | $H_c$ | $B_r$ | $G_n$ |
|---|---|---|---|---|
| 13 | 0.800 | 639 | 1560 | 2.5 |
| A | 0.848 | 660 | 1330 | 2.8 |
| 14 | 0.749 | 940 | 3510 | 2.24 |
| B | 0.801 | 940 | 3920 | 2.61 |

What is claimed is:
1. A magnetic recording medium comprising a nonmagnetic support having at least one magnetizable coating thereon, said magnetizable coating comprising a magnetizable pigment dispersed in a binder composition having a S value of less than $8 \times 10^{-3}$ over a temperature range of about 50° C., said composition comprising:
(a) about 30 to 90 percent by weight of a block copolymer having the general formula

A—B—B—A; and (b) about 10 to 70 percent by weight of a star block copolymer having the general formula:

A—B—Y—(B—A)$_n$ wherein
- A is a hard polymeric segment having a molecular weight of about 10,000 to 70,000 and a $T_g$ of greater than about 70° C.;
- B is a soft polymer segment having a molecular weight of about 15,000 to 70,000 and a $T_g$ of below about −30° C.;
- n is an integer of about 2 to 15; and
- Y is a multi-functional coupling agent.

2. The recording medium of claim 1 wherein said segment A is comprised of a monovinyl aromatic monomer having about 8–18 carbon atoms and segment B is comprised of a conjugated diene monomer having about 4–12 carbon atoms.

3. The recording medium of claim 12 wherein said binder composition has an S value of less than $8 \times 10^{-3}$ over a temperature range of about 100° C.

4. The recording medium of claim 3, wherein said binder composition has an S value of less than $5 \times 10^{-3}$.

5. The recording medium of claim 4 wherein said binder composition has an S value of less than $2 \times 10^{-3}$.

6. The recording medium of claim 2 wherein said monovinyl aromatic monomer is selected from the group consisting of styrene, hydrogenated or partially hydrogenated styrene, and alkylated styrenes.

7. The recording medium of claim 2, wherein said conjugated diene monomer is selected from the group consisting of butadiene, isoprene and piperylene, and hydrogenated or partially hydrogenated butadiene, isoprene, and piperylene.

* * * * *

UNITED STATES PATENT AND TRADEMARK OFFICE
CERTIFICATE OF CORRECTION

PATENT NO. : 5,128,215
DATED : July 7, 1992
INVENTOR(S) : Daniel B. Pendergrass, Jr.

It is certified that error appears in the above-identified patent and that said Letters Patent is hereby corrected as shown below:

Column 2, line 63, "31-30°C." should read --30°C.--

Column 4, line 10, insert --grown as follows:-- after the word "be".

Column 8, line 15, "Butadine" should read --Butadiene--.

Signed and Sealed this

Thirtieth Day of August, 1994

Attest:

BRUCE LEHMAN

Attesting Officer

Commissioner of Patents and Trademarks